United States Patent Office 3,395,522
Patented Aug. 6, 1968

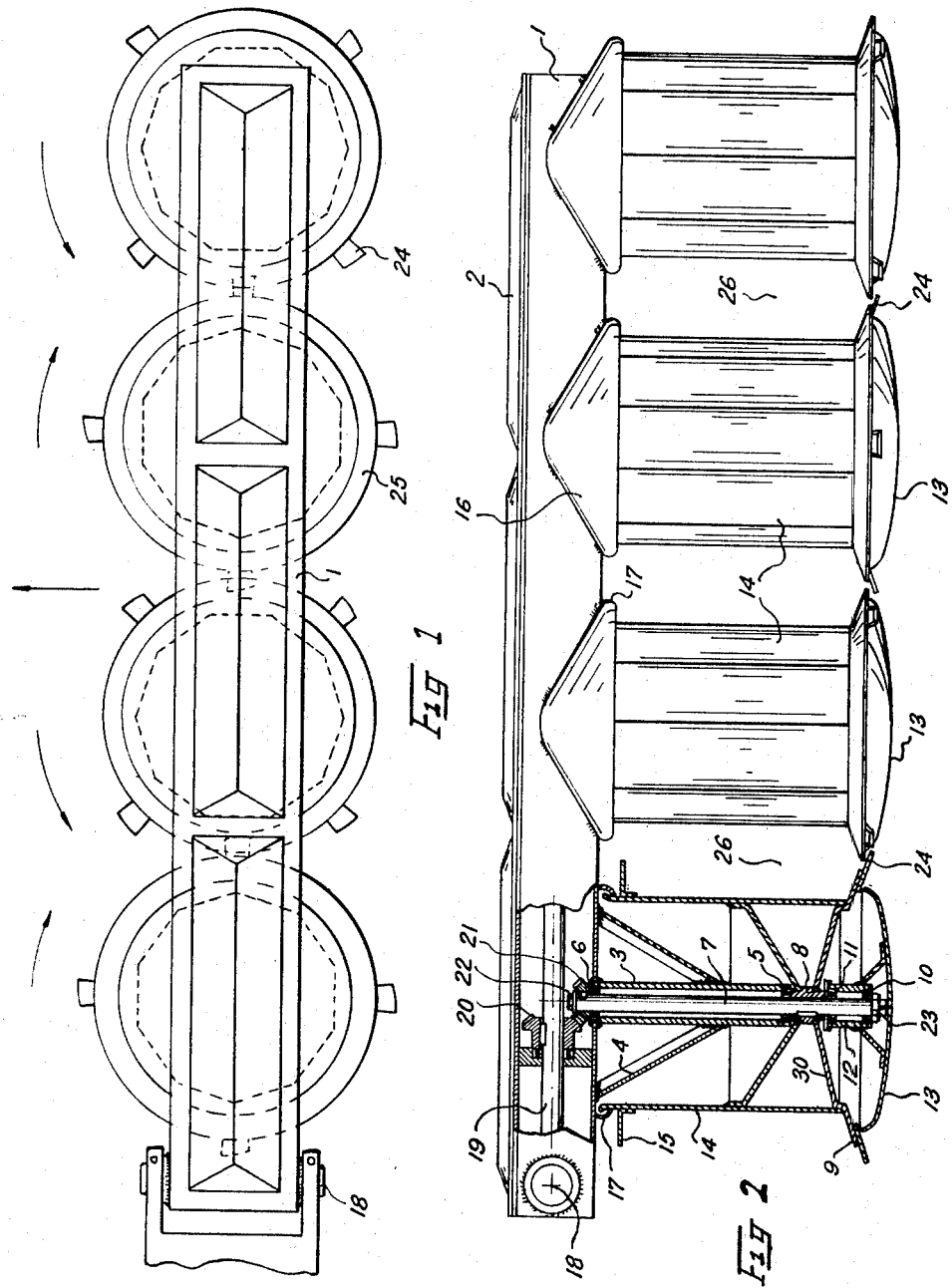

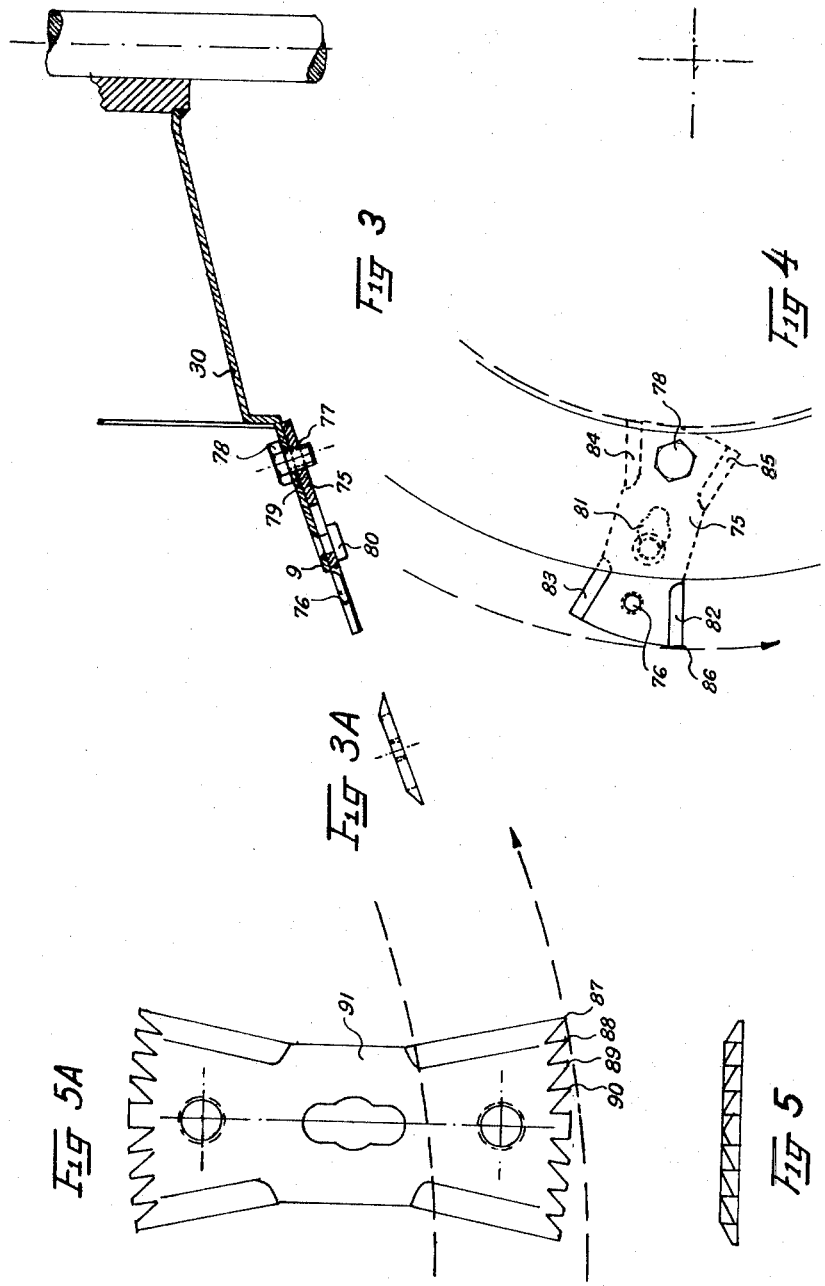

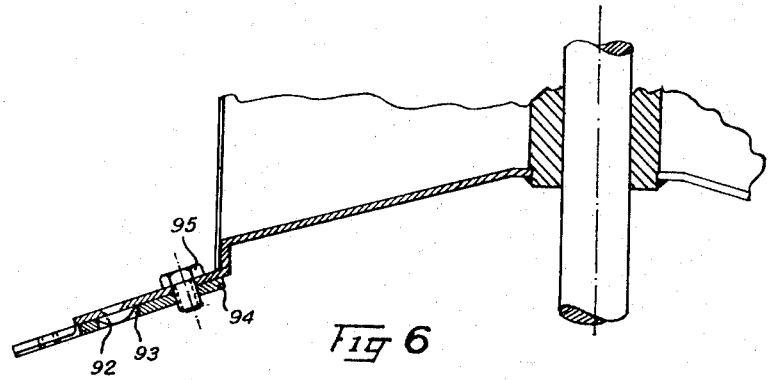
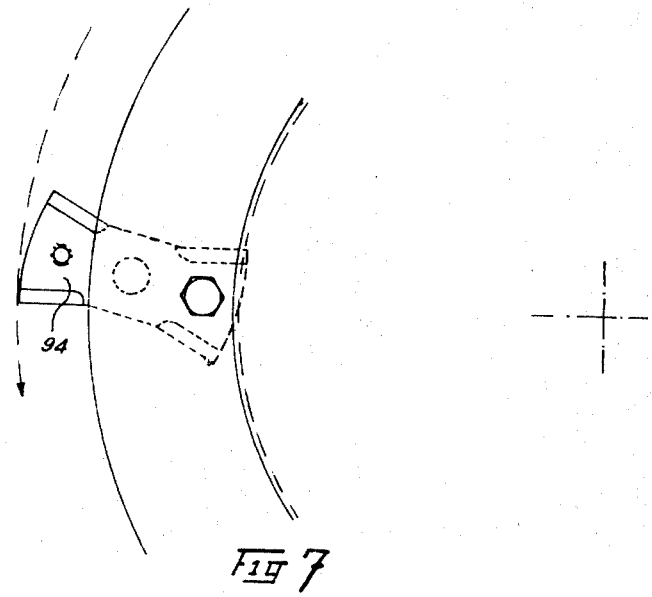

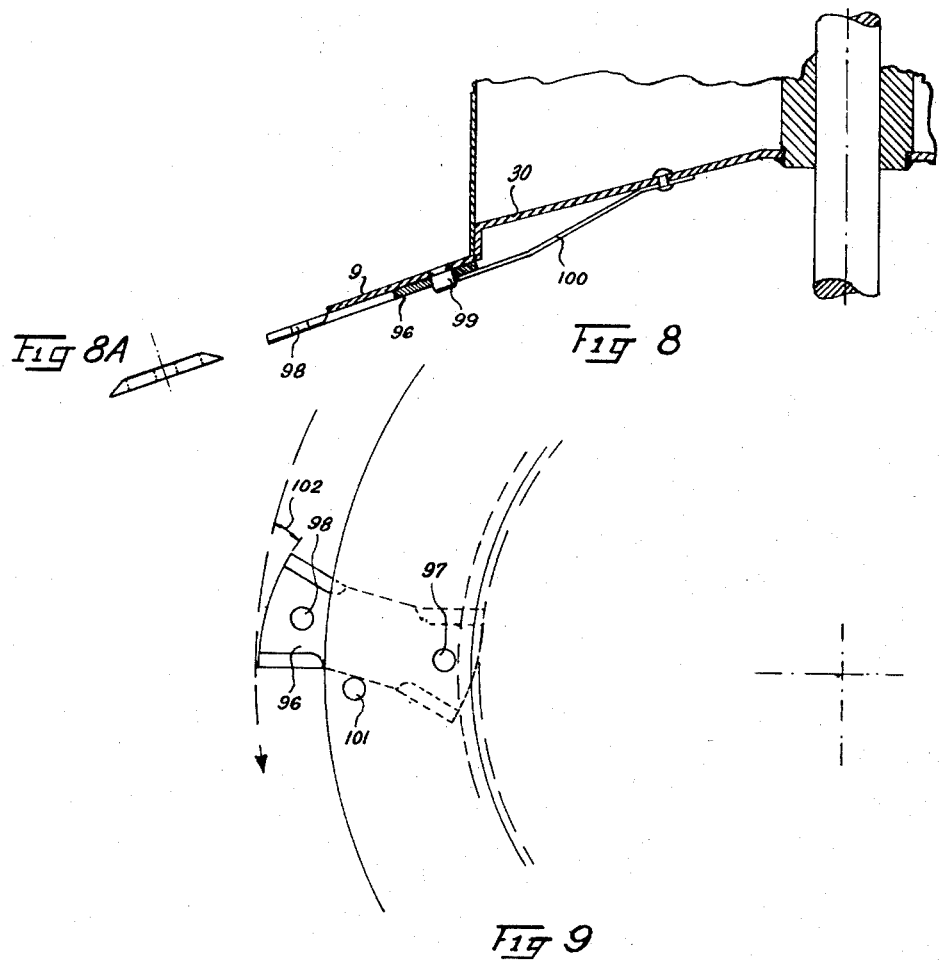

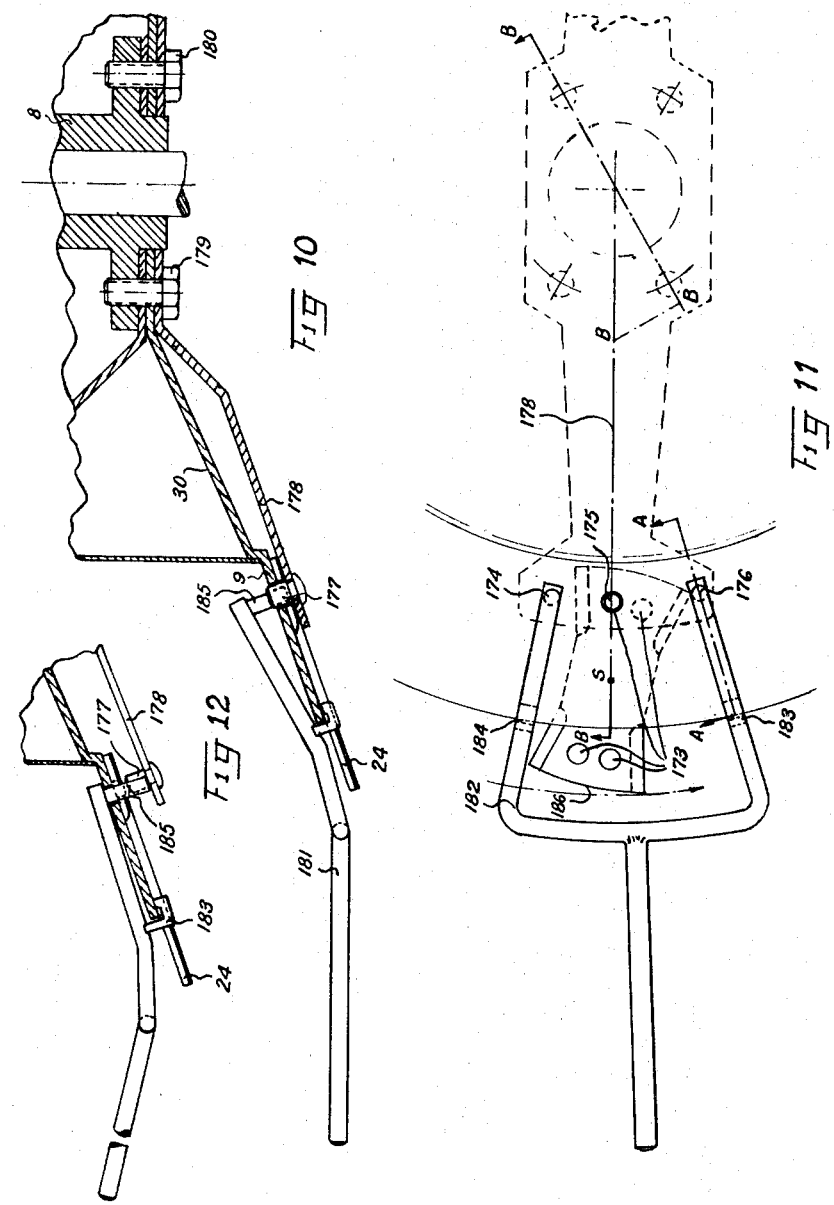

3,395,522
MOWING MACHINES
Petrus Wilhelmus Zweegers, Eindhovenscheweg 2,
Geldrop, Netherlands
Filed July 6, 1965, Ser. No. 469,393
Claims priority, application Netherlands, July 11, 1964,
6407939; Oct. 9, 1964, 6411816
8 Claims. (Cl. 56—295)

ABSTRACT OF THE DISCLOSURE

Mowing machine having at least one rotatable cutting device including a conical downwardly flaring flange, and at least one cutter mounted beneath the flange. A saucer-like ground engaging support is beneath each flange concentrically therewith, defining an annular slot between the lower flange surface and the peripheral edge of the support. Cutter protrudes through slot, but more than one-half of the cutter is arranged radially inwardly of the flange edge.

---

This invention relates to a mowing machine, comprising a frame carrying at least one collar for rotation about a substantially vertical axis, the peripheral portion of said collar having the shape of a downwardly inclined truncated cone, cutters being mounted against the lower surface of the cone shaped portion, and a drive for the collar being provided.

In a known machine of this type, triangular cutters are held against the collar by two screws, such that a portion of the cutters adjacent the inner side thereof is pressed against the lower surface of the conical part of the collar. This known mounting may be used for small hand mowers, but it leaves much to be desired when the requirements are higher, e.g., in hay making. Replacement of the cutters e.g. is a troublesome job. However, the mounting of the cutters may only be designed for easier replacement if one takes into account that the cutters are subject to very high centrifugal stresses during mowing, since this requires speeds in the order of 2000–3000 revolutions/minute, and the cutters becoming detached from the collar and flying away should be prevented, because this can cause serious accidents.

It is an object of the invention to provide a construction in which the cutters cannot fly away, and this object is obtained according to the invention by providing the gravitational centre of each cutter in a portion of the cutter which rests in abutting relationship against the lower surface of the conical part of the collar. Thus, the centrifugal force does not pull the cutters away from their mounting, but on the contrary, it pushes the cutters against the collar, so that the mounting is subjected mainly to shear forces only. Even in the improbable event that the mounting cannot bear the load of the shear forces, the cutter obtains an initial speed, upon breaking away from its mounting, which is directed obliquely into the ground, so that even in this case, the cutter digs immediately into the ground and does not cause an accident.

In a mowing machine which is provided with a saucer shaped supporting member below the collar, the safety may be further increased by situating the upwardly curved edge of the saucer shaped supporting member is situated inward of the edge of the collar, such that the collar and the supporting member define a ring shaped slot between them and the cutters protrude through this slot. In the improbable event that a cutter should break away from its mounting and move outward through the ring shaped slot, the supporting member prevents, even after passing of the center of gravity of the cutter past the edge of the collar, the cutter from following an outwardly directed curved trajectory, but it guides the cutter even more securely into the ground.

Because of the great safety of the cutter arrangement according to the invention, it becomes possible to hold each cutter against the lower surface of the collar by means of a quick action mounting. Further, each cutter may be provided, without decreasing safety, with a plurality of cutting edges and it may be mountable in a plurality of positions on the collar, such that in each position another one of the cutting edges is in operative position. Preferably, each cutting edge has a stepped shape so that after one step wears away, the next step of the same cutting edge comes into operation and the replacement or reversing of the cutters is only necessary after all steps of one cutting edge are worn out.

Further, each cutter may be yieldably mounted in a direction opposite to its direction of rotation, so that it yields upon hitting a hard obstacle, without harm to the machine. Yieldable mounting of cutters is known per se, but in combination with the present cutter arrangement this mounting can be used without any special safety precaution.

The cutters are preferably so mounted that the operative cutting edge of each cutter is in an axial plane of the collar, or in other words, said cutting edge is directed radially of the collar when seen in plan, and preferably, the cutter assumes this operative position auomatically. When the cutter is symmetrical and its lower edge is defined e.g. by a part of a circle, the mentioned operative position of the cutter ensures moreover that the outer edge of the cutter recedes behind the cutting edge so as to present a clearance behind the cutting edge, as is desirable for good cutting action.

Further, the mounting may be constructed so that the cutters upon hitting an obstacle describe a full circle of 360° about their pivot and so return to their operative position.

The invention will now be further elucidated by reference to the accompanying drawings.

FIG. 1 is a plan view of a mowing machine having a cutter mounting according to the invention.

FIG. 2 is a rear elevational view of the same machine with parts broken away.

FIG. 3 is a section, to a larger scale, of a first embodiment of the cutter mounting.

FIG. 3A is an end elevational view of the cutter shown in FIG. 3.

FIG. 4 is a plan view of the embodiment according to FIG. 3.

FIG. 5 is an end elevational view, to a still larger scale, of a modified cutter having stepped cutting edges.

FIG. 5A is a plan view of the cutter of FIG. 5.

FIG. 6 is a section according to FIG. 3, of another embodiment.

FIG. 7 is a plan view of the embodiment according to FIG. 6.

FIG. 8 is a corresponding section of a third embodiment.

FIG. 8A is an end elevational view of the cutter shown in FIG. 8.

FIG. 9 is a plan view of the embodiment according to FIG. 8.

FIG. 10 is a corresponding section of a fourth embodiment.

FIG. 11 is a plan view of the embodiment according to FIG. 10.

FIG. 12 is a section, corresponding to FIG. 10, in which the tool indicated also in FIGS. 10 and 11 is in the position in which it releases the cutter.

The mowing machine according to FIGS. 1 and 2 has a box-shaped frame beam 1 which is closed by a profiled cover 2. The left end of the frame beam 1 is provided with a pair of journals 18 by which it is so suspended from a tractor that it can pivot about a horizontal axis, and it protrudes laterally of the tractor. In the suspension device, there is also a vertical pivot axis so that the frame beam 1 can be pivoted to the rear of the machine when transported over the road. The suspension of the frame beam 1 is preferably connected to the three point linkage of the tractor, so that the position of the frame beam 1 may be adjusted.

Spaced over the length of the frame beam 1, the lower side thereof carries four downwardly directed tubes 3 which are welded to the beam 1, the connection being reinforced by inclined braces 4. Bearings 5 and 6 are mounted in each tube 3 and a shaft 7 is journaled in said bearings. Immediately below the bearing 5, the hub 8 of a drum 14 is fixed on the shaft 7 by means of a cotter connection. Below the hub 8, the shaft 7 carries two further bearings 10 and 11 which support the hub 12 of a support member 13 which rests on the ground. Each support member 13 is saucer shaped and it is journaled on the shaft 7 for free rotation thereon, by means of the bearings 10 and 11.

The drum 14 is profiled, e.g., in the shape of a regular decagon, and it is connected to the hub via two ring flanges e.g., the lower ring flange 30 being continued outside of the drum so as to form a collar. Said collar 9 carries the cutters 24 against its lower surface. Although FIGS. 1 and 2 show four cutters 24 on each collar 9, two cutters per collar can be used advantageously in many cases. The cutter 24 is fixed in abutting relationship against the conical lower surface of the collar 9, preferably so that it can easily be replaced and so that it can pivot away when hitting a hard obstacle. The cutters of adjacent drums are so staggered with respect to each other that when the drums rotate, the cutters of adjacent drums do not touch each other.

The upper part of the drum circumference 14 may carry a ring 15 for closing the upper side of the discharge slot defined between two adjacent drums and this ring may also carry cutters. The upper end of each drum may be closed by a conical cap 16 welded to the frame beam 1. The inwardly bent edge 17 of the cap 16 fits with a small clearance about the circumference of the drum 14 so that it prevents plants and dirt from entering the drum.

The shafts 7 are driven from the tractor, i.e. by means of a shaft journaled concentrically in the journals 18 and connected by gearing to a main shaft 19 positioned in the frame beam 1. The main shaft 19 carries a bevel gear 20 near each drum which engages a bevel gear 21 fixed on the upper end of the shaft 7. The direction of rotation of any drum 14 is determined by whether the associated bevel gear 20 is mounted to the right or to the left of the engaging bevel gear 21. In the embodiment according to FIGS. 1 and 2, the gears 21 are alternately mounted to the right and to the left of the associated gears 21.

When mowing, the machine is moved over the field by a tractor in the direction indicated by an arrow in FIG. 1, whereas the several drums 14 rotate in the directions indicated also by arrows in FIG. 1. The crop is cut by the cutters 24, it is conveyed by the profiled drums through the discharge slot defined between each pair of co-operating drums and it is deposited behind the machine in the form of two swaths.

The saucers 13 support the machine when mowing and the upper edge of each is curved upwardly to a point about at the same level as but inward of the lower edge of the collar. The edges of the collar 9 and the saucer 13 respectively define a ring shaped slot between them, part of each cutter 24 projecting through said slot, and the remainder of each cutter 24 rests in abutting relationship against the lower surface of the conical circumferential part of the collar. It appears e.g., from FIG. 2 that such a portion of the cutters 24 is situated inward of the edge of the collar that the centre of gravity of the cutters is in that portion of the cutters which abuts against the collar and thus, the centrifugal force presses the cutters against the truncated conical circumferential part of the collar during their rotation.

The shape of the cutters 24 is basically a somewhat rectangular plate, of which the longer dimension is situated in about a radial direction of the collar, and the long edges of the plate have two cutting edges and an intermediate blunt portion each. The short edges of the plate have a curved configuration and the cutting portions of the long edges are about positioned on a radius of curvature of the adjacent short edge such that the cutting portions of the long edges diverge somewhat with respect to the straight intermediate portion. The length of each cutting edge is about ⅓ of the total length of each long edge, and only about ⅓ of the length of the cutter projects from below the collar 9 so that only one cutting edge of the forwardly directed side of the plate projects at any time.

According to FIGS. 3 and 4, the cutter 75 has a central oblong aperture 81 directed parallel to the long axis of the cutter plate and the central portion of the aperture 81 is enlarged so as to enable the enlarged head of a short pin 80 which is fixed at the lower surface of the collar to pass through it. After the pin 80 passes through the center of the aperture 81, the cutter may be fixed to the collar 9 in the direction normal to it, by lateral displacement of the cutter 75 so that the pin 80 will become situated at one end of the aperture 81. The cutter 75 has moreover a screw threaded hole 76 or 77 respectively on both sides of the aperture 81 and the conical outer part of the collar has a hole 79 in such a position that a screw 78 can be inserted from the upper side of the collar through the hole 79 into the screw threaded hole 77 or 76 respectively when the cutter is disposed in its operative position, namely the position in which the projecting cutting edge thereof which is at the front side of the cutter in the direction of rotation is about radially disposed, when viewed in plan, with respect to the collar axis. By tightening the screw 78, the cutter 75 is fixed on the cutting disk. In FIG. 4, the cutting edge 82 is in operative position and after this cutting edge wears out, the cutter may be given half a turn about the pin 80 after loosening the screw 78, so that the cutting edge 84 comes into operative position. The other cutting edges 83 and 85 cannot be used on this collar, but they should be used on a cutting disk which rotates in the opposite direction. Thus, when the two diametrically opposed cutting edges of the cutters of a machine comprising several cutting devices have been worn out, the cutters of the clockwise rotating collars will be interchanged with the cutters of the anticlockwise rotating collars so that the two remaining cutting edges of each cutter can then be used.

It appears from FIG. 4 (and also from the corresponding figures of the other embodiments) that in the operative position of a certain cutting edge, that is the cutting edge 82 in FIG. 4, the axis of the cutter is somewhat inclined to the cutting disk, since the cutting edge 82 itself is radially disposed, and because of the inclined position of the cutter, the curved outer edge of the cutter recedes from the tip 86 of the cutting edge 82 in rearward direction, such that there is a clearnce angle behind the tip 86, which promotes the cutting action.

According to FIG. 5, the cutter 91 has, besides the four cutting edges at the two long edges of the plate, several further cutting edges formed on the flat surface so as to be parallel to the four first-mentioned cutting edges. With this arrangement, the cutter can be used a long time before it comes necessary to turn the cutter around or to replace it respectively, because after the tip 87 of the outer cutting edge wears out, the next cutting edge 88 comes into operation, then the edge 89, the edge 90, and so on.

In the embodiment according to FIGS. 6 and 7, a cylindrical hole 93 is provided in the cutter 94 in the same position as the oblong aperture 81 in the former embodiment, and instead of the pin 80, the lower surface of the collar carries a rivet 92, of which the protruding head forms a part spherical protrusion which is normally situated in the hole 93 of the cutter. When the cutter 94 hits an obstacle so hard that it cannot cut it, the cutter 94 flexes about its fastening screw 95 so that it can slide over the head 92 and yield rearwardly by rotation about the screw 95. After loosening the screw 95, the cutter can be turned back to its operative position and be fastened again. However, it is also possible to design the mounting so that the cutter, upon hitting a hard obstacle, moves through a full circle of 360° about its pivot and thus returns to its operative position.

The embodiment of FIGS. 8 and 9 shows a quick action mounting and an automatic return of the cutters to their operative position. Between the two pairs of cuting edges of the cutter 96, the cutter has a hole 97 or 98 respectively for mounting it on the collar, but in this case, the holes are not screw threaded, but they fit with ample clearance about a pin 99 fixed on the lower surface of the collar 9. Moreover, a spring such as dished plate spring 100 or a blade spring is fixed against the lower surface of the central part of the flange 30, so as to bear against the inner edge of the cutter 96. By lifting the spring 100, e.g., by means of a screw driver, the cutter 96 can be disposed about the pin 99 and it will then be held against the collar 9 by the spring 100. The correct operative position of the front cutting edge is determined in this embodiment by a stop 101, which is located somewhat forward of the pin 99, viewed in the direction of rotation of the collar 9. During the rotation, the centrifugal force urges the cutter to assume the position in which its axis of symmetry is radial but the stop 101 prevents this, so that the centrifugal force presses the cutter firmly against the stop 101, which is located so that the forward cutting edge is held radial to the cutting disk, which is the best operative position. In this embodiment also, there is a clearance angle 102 behind the tip of the operating cutting edge. Upon hitting an obstacle, the cutter rotates about the pin 99, and the spring 100 is preferably so shaped that it leaves sufficient clearance for the cutter 96 to move through a full circle about the pin 99. The stop 101 may be so rounded that upon hitting an obstacle, the cutter slides over the stop so that it may return to its operative position by making a full turn.

In the embodiment according to FIGS. 10, 11 and 12 four mounting holes 173 are provided in each cutter, each mounting hole being located for holding one of the four cutting edges in operative position. In this embodiment, the mounting pin 177 is provided on a blade spring 178 such that it engages from below through one of the four holes 173 into a hole 175 provided in the collar 9 of the flange 30. The holes 173 are so situated in the cutter 24, that under the influence of the centrifugal force, the cutter adjusts itself on the pin 177 so that the cutting edge associated with the hole 173 in use is automatically held radial to the collar and no stop is necessary. The cutting edge in use is of course again the edge which protrudes outside of the collar and which is forward in the direction of rotation of the collar. The blade spring 178 has a bent configuration so as to provide sufficient clearance for the cutter 24 to make a full revolution about the pin 177. When the machine is stationary the cutters 24 are relatively free to rotate about the pin 177, this rotation only being prevented by the friction of the blade spring 178 on the cutter. When the machine is in operation, at a usual speed of about 3000 revolutions per minute, the centrifugal force constrains the operative cutting edge in the radial position, but when this cutting edge hits an obstacle, the cutter yields by turning rearwardly about the pin, and after making a full turn about the pin the cutter returns again automatically in the operative position.

In this embodiment, the blade spring has two arms radiating from the centre of the flange and held on the hub 8 by four screws 179, 180. With respect to a dished plate spring or a ring shaped spring, a two-armed blade spring is advantageous because the centrifugal force can more easily urge the spring from the downwardly inclined usual position to the straightened horizontal position, and thus, the spring will exert an additional pressure on the cutter 24 so as to clamp the cutter 24 more securely between the spring 178 and the collar 9 of the flange.

In the embodiment according to FIGS. 10–12, the four cutting edges of the cutter 24 can be used on one collar, because there is an individual hole for each cutting edge. In this embodiment also, there is a clearnace angle behind the top of the cutting edge because of the receding position of the short edge of the plate during the rotation.

In the embodiment according to FIGS. 10–12, a tool 181 may be used for replacing the cutter 24. Said tool 181 is fork-shaped and each fork leg has a jaw 184, which can rest on the edge of the collar, and the end of each fork leg is provided with a transverse pin 185, which can be inserted through a hole 174 or 176, respectively, in the collar 9 so as to push away the blade spring 178 for releasing the cutter 24. The holes 174 and 176 are so spaced with respect to the intermediate hole 175 that it is not possible to align the wrong hole 173 of the cutter 24 with the hole 175 because there would not be sufficient room between the hole 175 and (in FIG. 11) the pin protruding through the hole 174.

FIGURE 12 shows the position of the tool 181 in which the cutter 24 has been released from the pin 177. It is advantageous to mount the pin 177 on the blade spring 178, so that when the cutter hits an obstacle which moves the outer edge of the cutter upwards, there is no danger that the cutter 24 will be pushed from the pin 177, since when the inner edge of thec utter is pushed downwards, the pin 177 moves with it.

What I claim is:

1. A mowing machine comprising a frame, at least one rotary cutting device carried by said frame, a drive for rotating said cutting device about a substantially vertical axis, and an individual saucer-shaped supporting member mounted coaxially directly below said cutting device, said cutting device comprising a downwardly flaring conical flange, at least one cutter being mounted beneath said flange so as to protrude substantially radially and downwardly therefrom, the peripheral edge of said supporting member facing the lower surface of said conical flange so as to define a ring-shaped slot between said lower surface and said circumferential edge, said cutter protruding through the slot between said lower surface and the circumferential edge of said supporting member, 2. A mowing machine according to claim 1, in which more than half of said cutter is disposed radially inwardly of the peripheral edge of said conical flange.

3. A mowing machine according to claim 1, wherein said cutter has a hole, and including resilient means for holding said cutter against the lower surface of said flange, said means including a pin accommodated within said hole.

4. A mowing machine according to claim 3, wherein said means includes a blade spring carrying said pin at its outer end, the inner end of said spring being fastened to said cutting device at a point higher than the outer end of said spring, whereby the pressure of the outer end of said spring against said cutter is increased by centrifugal force when the cutting device rotates.

5. A mowing machine according to claim 4, wherein said blade spring is bent so that at least a portion of it is spaced from the lower surface of said flange so as to provide clearance for a full rotation of said cutter about said pin when said cutter hits an obstacle.

6. A mowing machine according to claim 4, wherein said flange is provided with a hole overlying a portion of said blade spring near the outer end of the latter, whereby a tool may be pushed through said hole to move said spring away from said flange and remove said pin from the hole in said cutter.

7. A mowing machine according to claim 1, including a hole in said cutter, and a pin accommodated within said hole and pivotally supporting said cutter, whereby said cutter is yieldable in a direction opposite to its direction of rotation when the cutting device is rotating.

8. A mowing machine according to claim 1 wherein said cutter is so mounted that its operative cutting edge is in a plane containing the axis of rotation of said cutting device.

References Cited

UNITED STATES PATENTS

| | | | |
|---|---|---|---|
| 2,071,872 | 2/1937 | Cockburn | 56—25.4 |
| 2,549,317 | 4/1951 | Laughlin | 56—25.4 |
| 2,669,826 | 2/1954 | Watrous | 56—25.4 |
| 2,924,058 | 2/1960 | Brooks | 56—295 |
| 3,010,269 | 11/1961 | Maguire | 56—295 |
| 3,247,657 | 4/1966 | Scarnato et al. | 56—295 |

FOREIGN PATENTS 846,853   8/1960   Great Britain.

RUSSELL R. KINSEY, *Primary Examiner.*